Nov. 5, 1957
D. HARRELL
2,811,934
CROSS GRAIN ADAPTER
Filed March 28, 1956
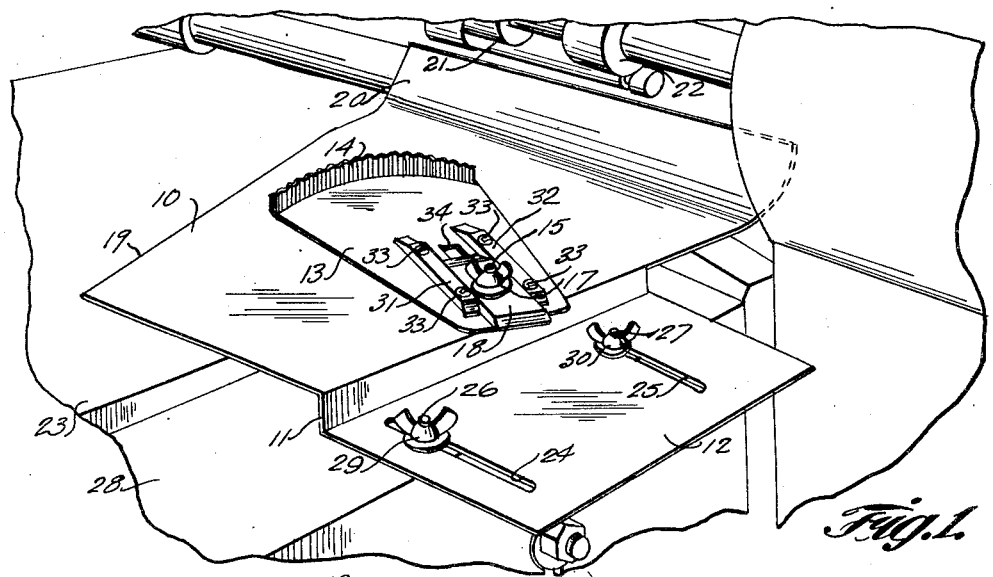
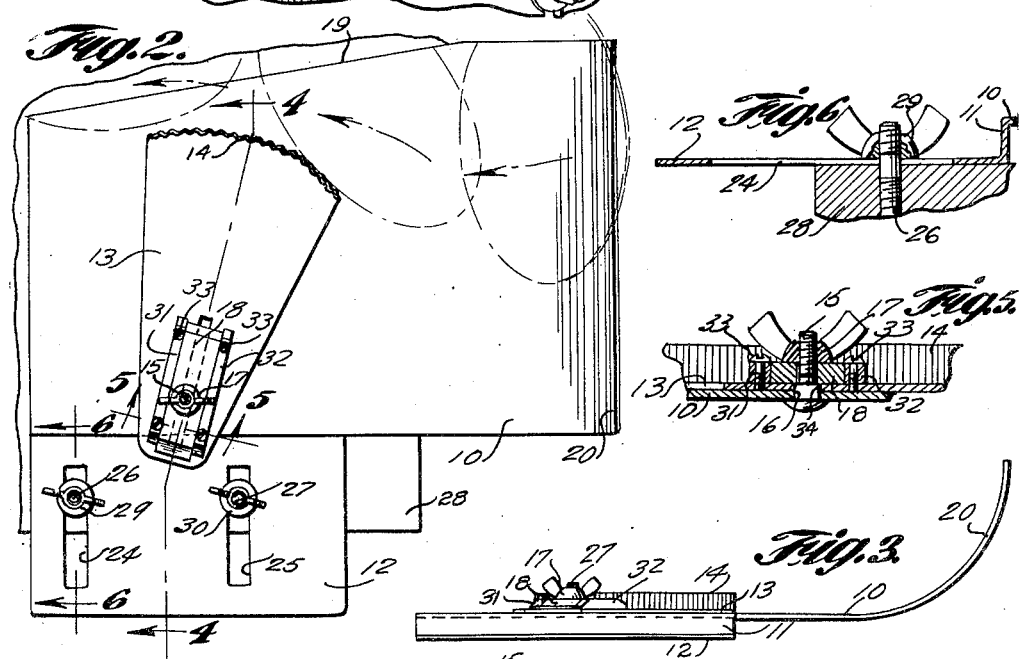
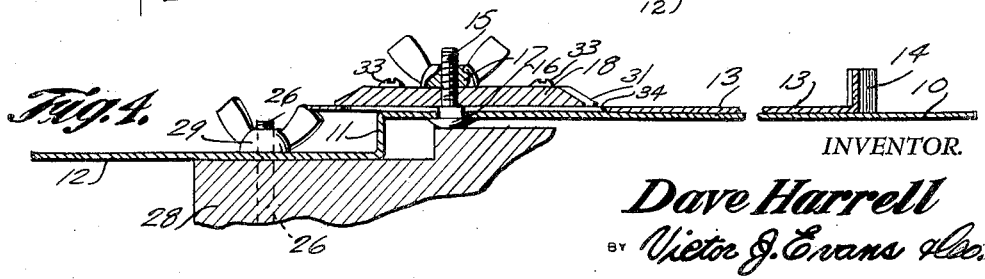
INVENTOR.
Dave Harrell
BY Victor J. Evans & Co.
ATTORNEYS

United States Patent Office 2,811,934
Patented Nov. 5, 1957

2,811,934
CROSS GRAIN ADAPTER
Dave Harrell, Rolla, Mo.
Application March 28, 1956, Serial No. 574,466
4 Claims. (Cl. 107—12)

This invention relates to bakery machines and equipment, and in particular a make-up device adapted to be positioned on a moulder for converting a straight-away-type moulder to a cross grain moulder for improving the quality of bread and other similar products.

The purpose of this invention is to reduce moulding holes and cores in bread and to improve the grain and inside characteristics of the bread.

In conventional make-up equipment used in bread production the dough passes straight through the moulder and during fermentation holes and cores develop in the dough making it difficult to maintain a smooth even texture or grain throughout bread baked from the dough. For this reason, cross grain moulders have been developed which turn the dough providing a work step which reduces the size and quantities of holes and cores in the final product. With this thought in mind this invention contemplates an attachment for a moulder of the type in which the dough passes straight through wherein with a portion of the dough on a conveyor belt and another portion coming in contact with an arcuate corrugated wall of the attachment providing a stop the dough is carried or turned through an angle of ninety degrees before it is pulled from the main plate by the belt and curled under the conventional curling chain of a conventional moulder by which it is pannet in the conventional manner.

The object of this invention is, therefore, to provide an attachment adapted to be adjustably mounted on a moulder for bread dough and the like in which the corrugated wall provides a stop turning the dough through an angle of substantially ninety degrees.

Another object of the invention is to provide a dough turning attachment for a moulder of the straight-away-type in which the attachment may be mounted on a moulder without changing parts of the moulder.

A further object of the invention is to provide a dough turning attachment for a moulder in which the device is of a simple and economical construction.

With these and other objects and advantages in view the invention embodies a plate carried by an offset base and having an arcuate upwardly disposed flange on one end and a segment, providing a stop, pivotally mounted on the plate and having an arcuate corrugated end wall in which the dough coming in contact with the corrugated end wall, with part of the dough on a conveyor belt causes a resulting turning action whereby the dough is turned through an angle of substantially ninety degrees causing a twist in the dough whereby holes and cores are substantially removed therefrom.

Other features and advantages of the invention will appear from the following description taken in connection with the drawing, wherein:

Figure 1 is a perspective view showing the attachment mounted on the moulder with the stop positioned to engage one side of a strip of dough passing between conventional rollers of the machine.

Figure 2 is a plan view of the attachment illustrating the turning movement of dough passing over the plate thereof, the dough being indicated in broken lines.

Figure 3 is a side elevational view of the attachment showing the arcuate edge turned upwardly to receive the dough.

Figure 4 is a cross section through the attachment taken on line 4—4 of Figure 2 with the parts shown on an enlarged scale and with parts broken away.

Figure 5 is a cross section through the segment forming the stop taken on line 5—5 of Figure 2 also with the parts shown on an enlarged scale.

Figure 6 is a cross section through the base of the attachment taken on line 6—6 of Figure 2 also with the parts shown on an enlarged scale.

Referring now to the drawing wherein like reference characters denote corresponding parts the improved make-up equipment attachment in this invention includes a plate 10 extended by an offset section 11 from a base 12, and a segment 13 providing a stop having an upwardly extended arcuate corrugated wall 14, adjustably mounted on the plate 10 with a stud 15 extending through an opening 16 in the plate 10 and having a wing-nut 17 threaded thereon for clamping a slider 18 in position on the bed.

The plate 10 is formed with a beveled or inclined outer edge 19 and an arcuate upwardly extended section 20 is provided on the dough receiving end whereby the plate is adapted to receive the dough passing between rollers 21 and 22 and traveling on a conveyor belt 23. The base 12 of the plate 10 extends from the lower edge of the offset portion or flange 11, and as shown in Figure 1, the base is provided with slots 24 and 25 through which studs 26 and 27, threaded in the bed 28 of the machine extend, the studs being provided with wing-nuts 29 and 30, thereby providing means for adjusting the position of the base and the plate laterally on the bed of the machine.

The segment 13 is provided with spaced parallel guides 31 and 32 which are secured to the segment by screws 33 and the slider 18 is slidably mounted between the guides providing means for adjusting the position of the stop or segment on the plate 10. The segment is provided with a slot 34 through which the stud 15 extends.

With the parts formed as illustrated and described the attachment is positioned on the bed of a moulder with the arcuate end 20 positioned to receive dough and as dough passes over the plate 10 with substantially one half of the dough on the conveyor belt 23 and the other half on the plate the portion on the plate engages the stop, or corrugated wall 14 which turns the dough substantially through an angle of ninety degrees providing a working action which eliminates holes and cores in the dough.

The parts are adjustable making it possible to obtain substantially any turning movement desired.

It will be understood that modifications, within the scope of the appended claims, may be made in the design and arrangement of the parts without departing from the spirit of the invention.

What is claimed is:

1. An attachment for a moulder having a dough carrying conveyor belt comprising a plate, a base offset from the plane of the plate and from which the plate extends, means for adjustably mounting the plate on the bed of a moulder, and a segment adjustably mounted on the plate and having an arcuate corrugated wall extended upwardly from the extended end thereof, said corrugated wall being positioned to be engaged by dough passing over the plate.

2. An attachment for a moulder comprising a plate having an offset base and having an arcuate upwardly extended end, and a stop slidably and pivotally mounted on the plate and positioned in the path of products passing over the plate.

3. In an attachment for a moulder, the combination which comprises a plate having an arcuate extended end and having an offset base extended from one side, said base having spaced elongated slots therein, a segment having a corrugated arcuate upwardly extended wall on the extended end pivotally mounted on the plate, spaced guides having parallel opposed surfaces positioned on the segment, and a slider positioned between the guides.

4. In an attachment for a moulder, the combination which comprises a plate having an arcuate upwardly extended end and also having an offset base extended from one side, said base having spaced parallel slots therein, studs threaded in the bed and extended through the slots, wing-nuts threaded on the studs, said studs being positioned whereby with the base on the bed of the moulder the plate is suspended over the conveyor, wing-nuts threaded on the studs for retaining the plate in adjusted positions, a stop including a segment pivotally mounted on the plate and having a corrugated arcuate flange extending upwardly from the extended end, means for clamping the segment in adjusted positions on the plate, spaced parallel guides mounted on the segment, and a slider slidably mounted on the segment and positioned between the guides.

References Cited in the file of this patent
UNITED STATES PATENTS

| | | |
|---|---|---|
| 1,763,620 | Wolfarth et al. | June 10, 1930 |
| 1,871,753 | Smith | Aug. 16, 1932 |
| 2,707,924 | Hansen | May 10, 1955 |
| 2,714,358 | Boston | Aug. 2, 1955 |
| 2,735,382 | Hansen | Feb. 21, 1956 |
| 2,770,201 | Lanham et al. | Nov. 13, 1956 |